United States Patent [19]

Robinson

[11] 4,003,969

[45] Jan. 18, 1977

[54] CARBURETOR SYSTEM FOR INTERNAL COMBUSTION ENGINE

[76] Inventor: William C. Robinson, 5720 W. Rosewood Lane, Phoenix, Ariz. 85031

[22] Filed: Aug. 7, 1975

[21] Appl. No.: 602,690

[52] U.S. Cl. .............................. 261/145; 261/18 A; 261/30; 123/25 B; 123/133

[51] Int. Cl.² ...................................... F02M 25/02

[58] Field of Search ................. 261/18 A, 145, 30; 123/133, 135, 25 B, 25 D

[56] References Cited

UNITED STATES PATENTS

| 1,088,749 | 3/1914 | Underwood | 123/133 |
|---|---|---|---|
| 1,147,608 | 7/1915 | Clark | 123/133 |
| 1,339,465 | 5/1920 | Luke | 123/133 |
| 1,611,530 | 12/1926 | Judia | 261/18 A |
| 1,690,962 | 11/1928 | Allen | 261/18 A |
| 1,790,991 | 2/1931 | Marquette | 261/18 A |
| 2,312,151 | 2/1943 | Crabtree et al. | 123/133 |
| 2,742,886 | 4/1956 | McPherson | 261/30 |
| 3,237,926 | 3/1966 | Bickhaus et al. | 261/16 |
| 3,615,074 | 10/1971 | Cook | 261/18 A |

FOREIGN PATENTS OR APPLICATIONS

| 31,490 | 1/1908 | Sweden | 261/18 A |

Primary Examiner—Tim R. Miles
Attorney, Agent, or Firm—Warren F. B. Lindsley

[57] ABSTRACT

A carburetor system for a gasoline engine wherein the carburetor functions are accomplished through evaporation in a chamber external to the carburetor with additional benefits afforded through the use of a humidification chamber, the total process utilizing captured exhaust gases from the automobile exhaust manifold.

4 Claims, 1 Drawing Figure

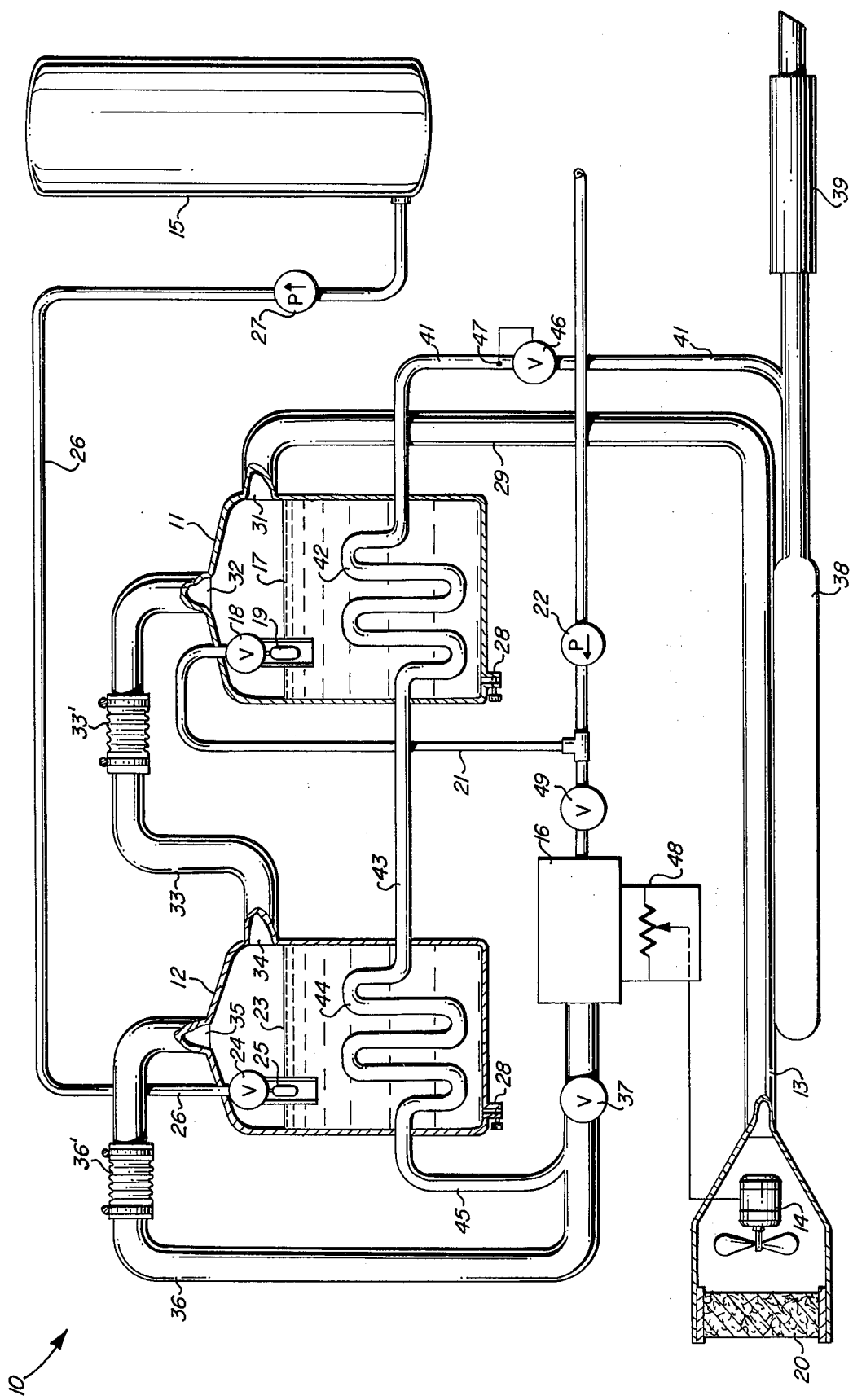

CARBURETOR SYSTEM FOR INTERNAL COMBUSTION ENGINE

BACKGROUND OF THE INVENTION

The rising cost of gasoline and the growing awareness of the nation's dwindling oil reserves emphasize the urgency for the attainment of improved efficiency in gasoline engine performance.

At the same time there is a widespread determination to end or greatly reduce the level of atmospheric pollution to which the automobile has contributed in the past.

Because the proper performance of the carburetor is essential to the realization of both of these goals, significant improvements in carburetor systems are urgently needed.

The conventional carburetor as employed in today's automobile is a complex mechanical device comprising as many as six separate systems: There is a float system for controlling the level of fuel in the bowl, there is a low-speed or idling system, a high-speed or cruising system, an accelerating pump system, a power system and a choke system. In addition there are anti-percolation vents, hot idle compensators, anti-dieseling solenoids, deceleration controls, etc.

This multitude of special systems and features requires careful adjustment and maintenance and the many small ducts and valves are vulnerable to blockage and wear by dust and dirt particles finding their way through the aid filter.

Furthermore, until recently, there has been a greater emphasis on certain aspects of performance such as starting, acceleration and power developed with too little emphasis given to gasoline mileage and atmospheric pollution. The sudden change in emphasis toward improved fuel economy and reduced atmospheric pollution calls for a radical new approach to carburetor design as opposed to the enhancement of today's model by the addition of still more vents, valves and modified venturies.

SUMMARY OF THE INVENTION

In accordance with the invention claimed an improved carburetor system is provided for the vaporization, aeration and humidification of gasoline prior to its introduction into the engine manifold.

It is, therefore, one object of this invention to provide an improved carburetor system for a gasoline engine.

Another object of this invention is to provide such an improved carburetor system which achieves greater fuel economy by virtue of its capability for supplying a more uniform mixture of air and gasoline.

A further object of this invention is to provide such a carburetor system which achieves greater fuel economy by virtue of its capability for converting the entrained fuel into more finely divided particles approaching the nature of a true gas.

A still further object of this invention is to provide such an improved carburetor system in which the fuel-air mixture is humidified to permit a higher compression ratio in the engine, thereby enhancing the fuel economy without adversely affecting engine wear.

A still further object of the invention is to provide as a result of the humidification of the fuel-air mixture a reduced detonation effect in the ignition of the fuel, this effect being attendant with and contributing toward the improvement in fuel economy.

A still further object of this invention is to provide as an additional result of the humidification process a reduction in fuel temperature as it enters the manifold thereby promoting longer life for the engine valves and other parts.

A still further object of this invention is to provide in such an improved carburetor system a means for effectively recirculating exhaust gases through the engine thereby more completely consuming the energy content of the fuel while reducing the amount of pollutants released to the atmosphere.

Yet another object of the invention is to provide a cleaner fuel burn with the result that oil changes will be required less frequently than for a conventional system.

Further objects and advantages of the invention will become apparent as the following description proceeds and the features of novelty which characterize the invention will be pointed out with particularly in the claims annexed to and forming a part of this specification.

BRIEF DESCRIPTION OF THE DRAWING

The present invention may be more readily described by reference to the accompanying drawing, in which:

FIG. 1 is a functional diagram of the improved carburetor system of the invention.

DESCRIPTION OF THE PREFERRED EMBODIMENT

Referring more particularly to the drawing by characters of reference, FIG. 1 discloses an improved carburetor system 10 comprising a vaporization chamber 11, a humidification chamber 12, an air intake manifold 13 supplied by an electric fan 14, a water supply tank 15 and a simplified carburetor 16.

The vaporization chamber 11 holds a controlled amount of fuel 17 which is held at a desired level by means of a valve 18 operated by a float 19, the valve 18 being supplied by a fuel line 21 which in turn is supplied by the fuel pump 22.

The humidification chamber 12 holds a controlled amount of water 23 which is held at a desired level by means of a valve 24 operated by a float 25, the valve 24 being supplied through a water line 26 which in turn, is supplied from the water supply tank 15 by means of a special water pump 27. This auxiliary water supply is protected against freezing in the colder climates by chemical additives. A petcock 28 is located at the bottom of each of the two chambers 11 and 12 to permit draining off sediment from the fuel or water.

The carburetor system 10 includes two parallel gas flow paths terminating in the carburetor 16.

The first gas flow path originates at the electric fan 14 which draws fresh air through a filter 20 into intake manifold 13 and follows a route leading from the manifold 13 through a duct 29 and an inlet port 31 into chamber 11, from there through an exhaust port 32 and through a duct 33 leading from chamber 11 to an inlet port 34 of chamber 12, from chamber 12 through an exhaust port 35 and a duct 36 leading through a valve 37 into carburetor 16. The intake and exhaust ports 31 and 32, respectively of chamber 11 and 34 and 35, respectively of chamber 12 are located above the levels of the contained fluids, so that the gas flow is over the surface of the fuel in chamber 11 and over the surface of the water in chamber 12. The air intake manifold 13 is located in direct contact with the automobile exhaust manifold 38. Flexible couplings 33' and 36' in the ducts 33 and 36, respectively, protect against rupture due to shock and vibration or forces arising from accidents and collisions.

The second gas flow path originates in the automobile exhaust line 38 ahead of the muffler 39, and it leads from there through a duct 41, a heat transfer coil 42 submerged in the fuel 17 of chamber 11, a duct 43 into a heat transfer coil 44 submerged in the water 23 contained by chamber 12, and thence through a duct 45 which leads again through the valve 37 into carburetor 16. In a dual exhaust system the duct 41 would have a branch originating ahead of each of the two mufflers.

The hot exhaust gas flowing through coils 42 and 44 raises the temperature of fuel 17 and water 23 to a desired level as controlled by a heat control valve 46 located in duct 41, the valve 46 responding to a temperature sensor 47 located inside duct 41 on the downstream side of valve 46. The elevated temperatures of fuel 17 and water 23 produces high vapor contents in chambers 11 and 12, i.e. vaporized fuel in chamber 11 and water vapor in chamber 12.

Heated air from manifold 13 entering chamber 11 through port 31 mixes with the fuel vapor absorbing large amounts of the entrained fuel which it carries along into chamber 12 where the entrained fuel is supplemented by water vapor, the further evaporation of water inside chamber 12 producing a cooling effect on the fuel-air mixture before it passes on through duct 36 and safety valve 37 into carburetor 16. The amount of air delivered from manifold 13 is regulated to meet the demands of the automobile engine by means of a rheostat 48 which is mechanically coupled to the throttle and which controls the speed of fan 14.

The circulation of the exhaust gas through coils 42 and 44 while serving to raise the temperatures of the fuel 17 and water 23 are appropriate to promote vaporization is itself cooled at the same time before it is returned to the carburetor. The exhaust gas from a typical gasoline engine contains a significant amount of useable fuel, and when this gas is cooled sufficiently as accomplished here, the residual fuel may be at least partially recovered. At the same time, the more complete combustion achieved by virtue of recirculation through the engine appreciably reduces the pollutants released to the atmosphere.

Valve 37 is a safety cut-off which blocks the flow of the air-gas mixture to carburetor 16 in the event of a backfire or other hazardous condition, the valve 37 being operated automatically by a pressure rise in carburetor 16.

An auxiliary fuel supply direct to carburetor 16 from fuel pump 22 is controlled by a fuel valve 49. This supply of fuel is utilized only under special conditions such as acceleration and heavy loads. The valve 49 is operated by vacuum control from the engine manifold.

While the carburetor system 10 is operable with a conventional carburetor 16, it is apparent that a much simplified carburetor may be substituted since carburetor 16 of system 10 serves little purpose other than as an entry to the engine manifold through the throttle valve. The elimination of the complexities of the conventional carburetor thus constitutes a very significant advantage in terms of reliability and reduced maintenance.

The foregoing description of the preferred embodiment has specifically referenced gasoline as the fuel, but other liquid fuels may be utilized as well in the practice of the invention.

A complete carburetor system is thus provided in accordance with the stated objects of the invention wherein the main carburetor functions are accomplished through thermal evaporation and absorption as opposed to the usual mechanical methods inside the carburetor itself. The evaporative method as taught by this invention produces a more finely divided, more uniformly dispersed air-gas mixture than is achieved by conventional methods, and with the additional benefits contributed by the humidification of the mixture the desirable end results of improved fuel economy and reduced pollution are realized.

To obtain the right fuel mixture, it is important to correlate the speed of the blower with the temperature of the fuel vaporization chamber 11.

Although but a single embodiment of the present invention has been illustrated and described, it will be apparent to those skilled in the art that various changes and modifications may be made therein without departing from the spirit of the invention or from the scope of the appended claims.

What is claimed is:
1. A carburetor system for a gasoline engine wherein the fuel vaporization functions are accomplished external to a carburetor comprising in combination:
   a gasoline vaporization chamber having fluid inlet and outlet ports,
   means for connecting a source of gasoline under pressure to said vaporization chamber,
   a first float means for controlling the level of gasoline in said vaporization chamber,
   an air intake manifold connected to said inlet port of said vaporization chamber at a point above the level of gasoline therein,
   a water humidification chamber having fluid inlet and outlet ports,
   means for connecting a source of water under pressure to said humidification chamber,
   a second float means for controlling the level of water in said humidification chamber,
   conduit means for connecting said fluid outlet port of said vaporization chamber arranged at a point above the level of gasoline in said vaporization chamber to said inlet port in said humidification chamber arranged at a point above the water in said humidification chamber,
   means for connecting said outlet port of said humidification chamber to a carburetor,
   means for heating the gasoline and water in said vaporization and humidification chambers,
   said means for heating the gasoline and water in said vaporization and humidification chambers comprising a common element extending in sequence through the gasoline and water in the chambers, and
   pressure means comprising a fan for forcing air under pressure through said air intake manifold over the gasoline surface in said vaporization chamber, through said conduit means, over the water surface in said humidification chamber and through said outlet port of said humidification chamber to the carburetor.
2. The carburetor system set forth in claim 1 wherein:
   said means for heating the gasoline and water is said vaporization and humidification chambers comprising a conduit means connected to the exhaust manifold of a gasoline engine, and means for connecting the exhaust end of said conduit means to the intake port of the carburetor.

3. The carburetor system set forth in claim 1 in further combination with:
a carburetor connected to said connection means for said outlet port of said humidification chamber.

4. The carburetor system set forth in claim 3 in further combination with:
means for connecting an auxiliary fuel supply directly to said carburetor for use on acceleration and heavy loads on the gasoline engine associated therewith with said carburetor.

* * * * *

UNITED STATES PATENT OFFICE
CERTIFICATE OF CORRECTION

Patent No. 4,003,969     Dated January 18, 1977

Inventor(s) William C. Robinson

It is certified that error appears in the above-identified patent and that said Letters Patent are hereby corrected as shown below:

Claim 2, line 2, after "water" cancel "is" and substitute ---in---.

Signed and Sealed this

Twenty-ninth Day of March 1977

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 4,003,969          Dated January 18, 1977

Inventor(s) William C. Robinson

It is certified that error appears in the above-identified patent and that said Letters Patent are hereby corrected as shown below:

On the cover sheet, item [76]

"5720 W. Rosewood Lane, Phoenix, Ariz."

should read

-- 5730 W. Rosewood Lane, Phoenix, Ariz. --.

Signed and Sealed this

Twenty-sixth Day of April 1977

[SEAL]

Attest:

RUTH C. MASON
*Attesting Officer*

C. MARSHALL DANN
*Commissioner of Patents and Trademarks*